United States Patent [19]
Chiddicks et al.

[11] Patent Number: 5,348,103
[45] Date of Patent: Sep. 20, 1994

[54] COMPOSTING MACHINE

[75] Inventors: Gordon A. J. Chiddicks, Bluevale; Christopher C. Lee, Walton, both of Canada

[73] Assignee: LH Resource Management Inc., Ontario, Canada

[21] Appl. No.: 931,956

[22] Filed: Aug. 19, 1992

[51] Int. Cl.$^5$ .............................................. A01B 33/02
[52] U.S. Cl. ...................... 172/45; 366/345; 71/9; 172/122; 172/101; 172/125
[58] Field of Search ............... 172/45, 71, 72, 121, 172/104, 118, 122, 125, 528, 529, 91, 92, 544, 546, 549, 618, 662, 712, 123; 366/219, 340, 345, 332, 261; 241/194, 189.2, 101.7; 435/312, 316; 422/255; 71/9, 12, 15, 901; 192/46; 74/578

[56] References Cited

U.S. PATENT DOCUMENTS

| | | | |
|---|---|---|---|
| 1,111,125 | 9/1914 | Baumann | 192/46 |
| 1,188,170 | 6/1916 | Graham | 192/46 |
| 1,460,052 | 6/1923 | Clark | 192/46 |
| 3,161,412 | 12/1964 | Ferris | 172/45 |
| 3,438,740 | 4/1969 | Brown | 71/9 |
| 3,746,101 | 7/1973 | Takata | 172/123 |
| 4,139,640 | 2/1979 | Kipp, Jr. | 71/901 |
| 4,410,348 | 10/1983 | Ito et al. | 71/9 |
| 4,462,695 | 7/1984 | Ito et al. | 366/345 |
| 4,499,614 | 2/1985 | Yeasley | 71/9 |
| 4,828,399 | 5/1989 | Pacentino et al. | 366/345 |
| 4,869,877 | 9/1989 | Sellew et al. | 71/9 |
| 5,204,263 | 4/1993 | Finn | 435/316 |

Primary Examiner—Randolph A. Reese
Assistant Examiner—Spencer Warnick
Attorney, Agent, or Firm—Daryl W. Schnurr

[57] ABSTRACT

A composting machine is used with an elongated reactor with flails mounted in a frame that moves longitudinally from a finishing end to a starting end during a processing pass. The flails move the organic material in the reactor along the reactor toward the finishing end. The flails are radially mounted on a shaft and the shaft rotates during the processing pass causing the flails to rotate as well. During a return pass, the flails can be made to occupy a horizontal plane so that the frame can return to the finishing end without raising the shaft vertically. Further, a skirt can be mounted adjacent to the flails to limit the distance that the material is moved by the flails. The distance of the skirt from a leading edge of the flails can be increased during the processing pass from the finishing end to the starting end. This allows the machine to be much more efficient as the level of the organic material can be maintained nearly constant from the starting end to the finishing end. With previous machines, the flail mechanism is moved vertically upward during the return pass so that the flails will clear the material.

28 Claims, 3 Drawing Sheets

COMPOSTING MACHINE

BACKGROUND OF THE INVENTION

1. Field of the Invention

This invention relates to a method and machine for composting organic material to aid aerobic decomposition and in particular to a flail mechanism used in an elongated reactor to move the material towards a finishing end of the reactor during a processing pass.

2. Description of the Prior Art

Composting machines used with an elongated reactor with a flail mechanism that moves organic material towards a finishing end during a processing pass are known. Usually, there is one processing pass each day. With previous machines, the flails are usually equally spaced longitudinally and radially affixed to a horizontal shaft. As there is one flail per longitudinal space, these flails have proven difficult to balance dynamically. In addition, when the flails are returned from the finishing end to the starting end so that another processing pass can begin, the shaft and the flails must be raised well above the reactor so that the flails will clear the material located within the reactor. Further, with previous machines, the flails sometimes move the material too far along the reactor. This can lead to inefficiency in that the depth of the material can be too shallow at some locations in the reactor. When the depth of material in the reactor is too low, the volume of material being processed by the reactor is obviously reduced.

SUMMARY OF THE INVENTION

It is an object of the present invention to provide a composting machine whereby the flails can be made to be rotatable relative to the shaft, thereby permitting the flails to be returned to the starting end of the reactor without raising the shaft above the level of the processing pass.

It is a further object of the present invention to limit the distance that the material is moved in one pass.

A composting machine for use with an elongated reactor in agitating organic material to aid aerobic decomposition in a composting process, said reactor having a base and two parallel side walls, said reactor having a starting end and a finishing end, has a flail mechanism having a plurality of flails mounted on a shaft and the shaft is rotatably mounted in a suitable frame. The shaft is substantially perpendicular to the side walls and the frame is mounted on the reactor and movable longitudinally relative thereto. The flails are mounted on the shaft by mounting means so that said flails have a first position and a second position. In a first position, the flails are rotatable with said shaft and are spaced circumferentially about said shaft, the flails being mounted to contact part of any material in the reactor as said flails rotate to move the material contacted along said reactor toward said finishing end. In a second position, said flails rotatably uninhibited for a limited degree of rotation relative to said shaft. There are power means to rotate said shaft and to move said frame longitudinally.

In a further embodiment of the invention, a composting machine for use with an elongated reactor in agitating organic material to aid aerobic decomposition in a composting process, said reactor having a base and two parallel side walls, said reactor having a starting end and a finishing end, has a flail mechanism having a plurality of flails radially mounted on a shaft. The shaft is rotatably mounted on a suitable frame and the frame is mounted on the reactor and is movable longitudinally thereto. The flails are mounted on the shaft so that they contact part of any organic material in the reactor during a processing pass and are out of contact with any organic material in a return pass. A skirt extends at least substantially across said reactor adjacent to said flails so that a distance that the material can be moved by said flails in a single pass will generally be limited by said material striking said skirt. The skirt is supported by said frame so that it can swing freely about its upper edge with power means to rotate said flails, move the frame longitudinally and to adjust the distance of said skirt from said flails.

In a method of the present invention, a method of operating a composting machine for use with an elongated reactor in agitating organic material to said aerobic decomposition in a composting process, said reactor having a base and two parallel side walls, said reactor having a starting end and a finishing end, said composting machine has a flail mechanism with a plurality of flails radially mounted on a shaft. The shaft is rotatably mounted on a suitable frame, the frame being mounted on said reactor and being movable longitudinally relative thereto. There are power means to rotate said shaft and to move said frame longitudinally relative thereto. There are means to limit the distance that the material is moved by the flails during a processing pass. The method comprises commencing a processing pass at the finishing end with the means for limiting at a minimum distance from a leading edge of the flails, causing the means for limiting to move steadily away from said leading edge as said flails move along the reactor until said flails reach the starting end where the means for limiting is at a maximum distance from said leading edge of said flails.

DESCRIPTION OF A PREFERRED EMBODIMENT

Figure 1:
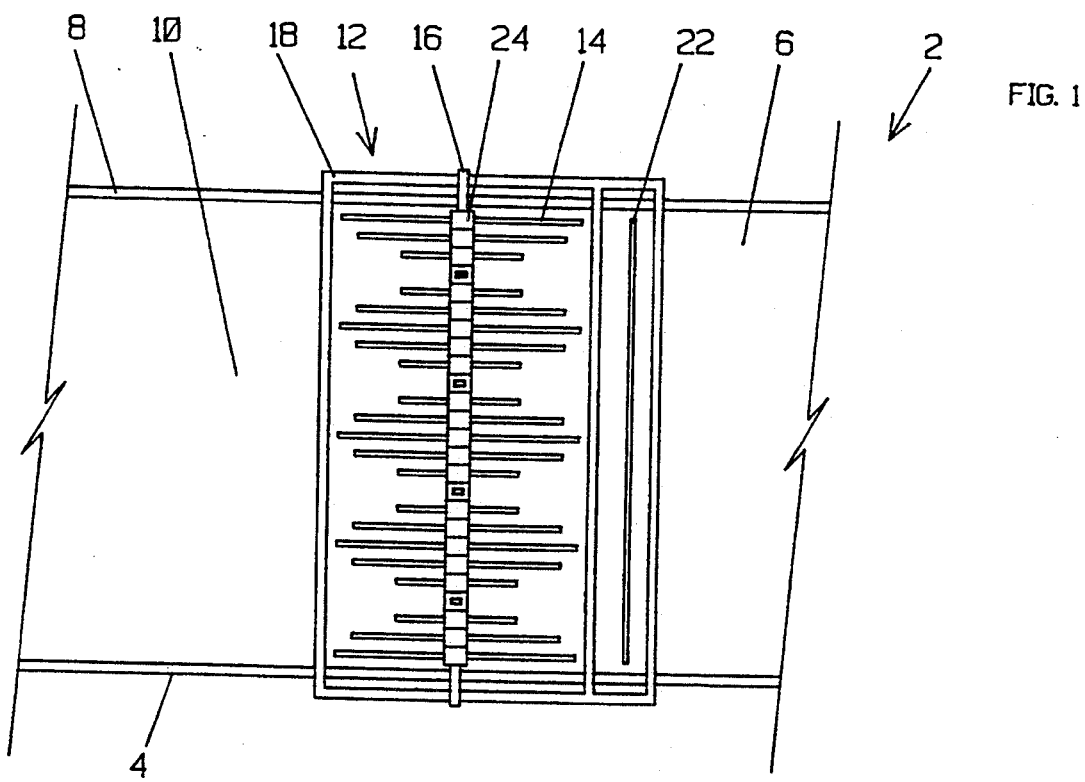
FIG. 1 is a top view of part of a reactor with a shaft having flails radially mounted thereon extending across the reactor.
Figure 2:
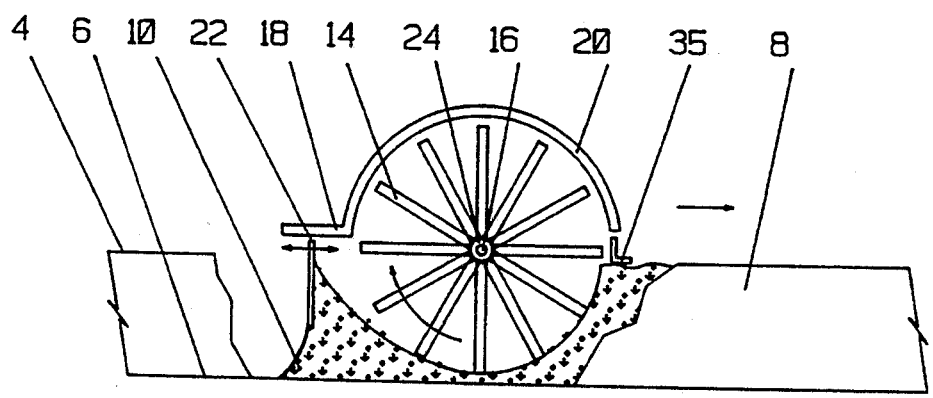
FIG. 2 is a partially cut away side view of the partial reactor and flails of FIG. 1.

In FIGS. 1 and 2, it can be seen that a composting machine 2 has an elongated reactor 4 with a base 6 and two parallel side walls 8. The reactor contains organic material 10 and is only partially shown in FIG. 1, the actual reactor having a length that greatly exceeds its width. While various sizes will be suitable, by way of example, a reactor could be 10 feet wide and 120 feet long. While it is not shown in the drawings, the reactor 4 has a U-shaped cross-section with the base 6 being flat. A flail mechanism 12 has a plurality of flails 14 radially mounted on a shaft 16. The shaft 16 extends across the reactor 4 and is rotatably mounted in a suitable frame 18. The frame is in turn mounted on the reactor 4 and the shaft is substantially perpendicular to the side walls 8. The frame is movable longitudinally relative to the reactor. The flails 14 all have an equal length and are spaced circumferentially around the shaft 16. As the shaft rotates, the flails contact part of any material 10 in the reactor to move the material contacted along the reactor towards a finishing end. The reactor 4 has a starting end and a finishing end, neither of which is shown in the drawings as the reactor is only partially shown. The starting end is the end of the reactor where the organic material is first placed into the reactor in order to be composted. The finishing end is the opposite end of the reactor where the composted material is removed. In FIG. 2, it can be seen from the arrows that the flail mechanism 12 is moving toward the starting end of the reactor while the flails rotate clockwise to move the organic material toward the finishing end. In FIG. 2, there is a safety shield 20 located above the flails 14. It can be seen that the flails 14 are equally spaced about the circumference of the shaft 16. A skirt 22 is mounted on the frame 18 in such a manner that an upper edge of the skirt 22 is affixed to the frame 18 and a remainder of the skirt is able to swing freely about the upper edge. The skirt 22 is located to a rear of the flails when the flails are moving forward from the finishing end to the starting end during a processing pass. There are power means to rotate the shaft and to move the frame longitudinally along the reactor. These power means have been deleted as have the details of the manner in which the frame is mounted on the side walls of the reactor as these features are conventional and readily apparent to those skilled in the art. As the flails proceed from the finishing end to the starting end during a processing pass, the organic material contacted by the flails is moved rearward. When a skirt 22 is used on the flail mechanism, the material will be moved rearward but will generally strike the skirt 22 which provides a limit to the distance that the material can be moved in a single pass. Obviously, it is possible that the flails will move a small amount of material above or beside and beyond the skirt. As the organic material builds up against the skirt as shown in FIG. 2, additional organic material will not strike the skirt but will strike the build-up of organic material in front of the skirt. The effect is the same in that the distance that the organic material will be moved is limited. As organic material builds up, the skirt will rotate about its upper edge and be dragged overtop of the material.

Preferably, a distance of the skirt from a leading edge of the flails is adjustable. When the flail mechanism moves from the finishing end to the starting end, during the processing pass, the skirt moves from a minimum distance to a maximum distance from said leading edge. Preferably, the maximum distance ranges from approximately around 50% to approximately 70% greater than the minimum distance. Still more preferably, the percentage change in the distance is equal to the percentage volume reduction of organic material in the reactor from the starting end to the finishing end.

It is preferred to move the flail mechanism from the finishing end to the starting and during a processing pass with the flails rotating to move the organic material rearward toward the finishing end. However, it would be possible to move the flail mechanism in the opposite direction (i.e. from the starting end to the finishing end) during a processing pass with the flails rotating to move the organic material forward toward the finishing end. The skirt, in this embodiment, would move from a maximum distance to a minimum distance as the flail mechanism moves from the starting end to the finishing end.

Figure 3:
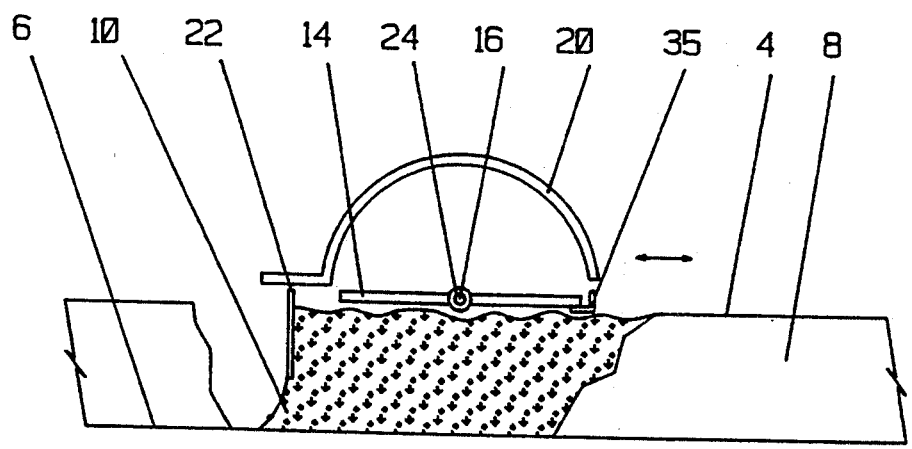
FIG. 3 is a partially cut away side view of part of a reactor with the flails in a horizontal plane.

The position of the flails shown in FIG. 2 is a first position. In FIG. 3, the flails are shown in a second position where they are rotatably uninhibited for a limited degree of rotation relative to the shaft 16. In FIG. 3, the flails are shown to occupy the same horizontal plane extending through the longitudinal axis of the shaft 16. Though it is preferable, it is not necessary that the flails lie in the same horizontal plane during a return pass. As long as the flails are movable relative to the shaft 16 during a return pass, the actual position of the flails will be determined by the level of organic material within the reactor. As the flails strike organic material during the return pass, they will be rotated to a new position on the shaft 16 without moving the organic material by any appreciable amount. The flails 14 are connected to the shaft 16 by mounting means which is a plurality of sleeves 24 that are mounted along the length of the shaft 16. Each sleeve supports at least one flail and preferably supports at least two flails that are 180° apart from one another.

Figure 4:
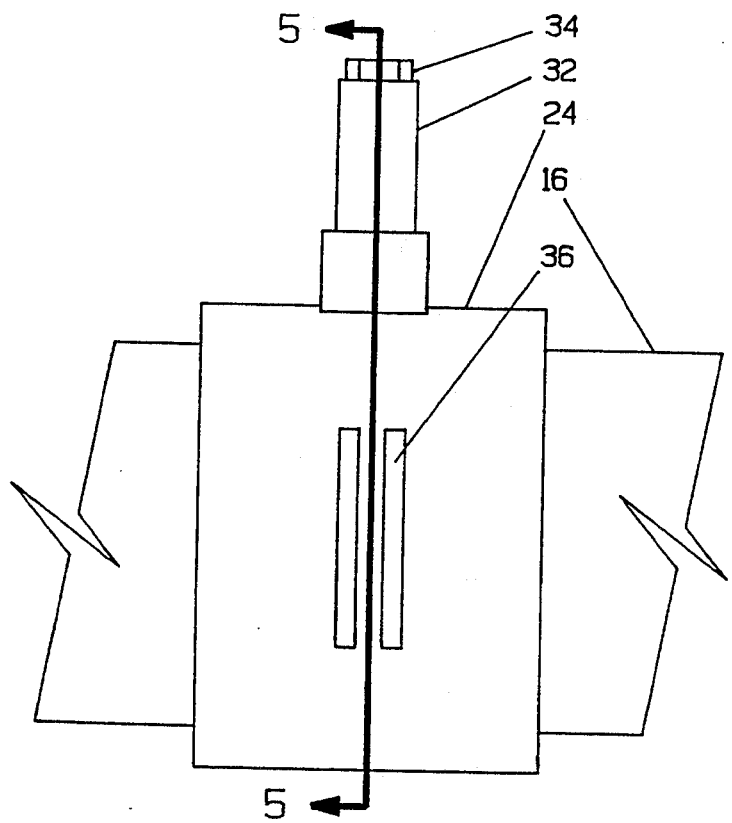
FIG. 4 is a partial side view of one sleeve mounted on the shaft.
Figure 5:
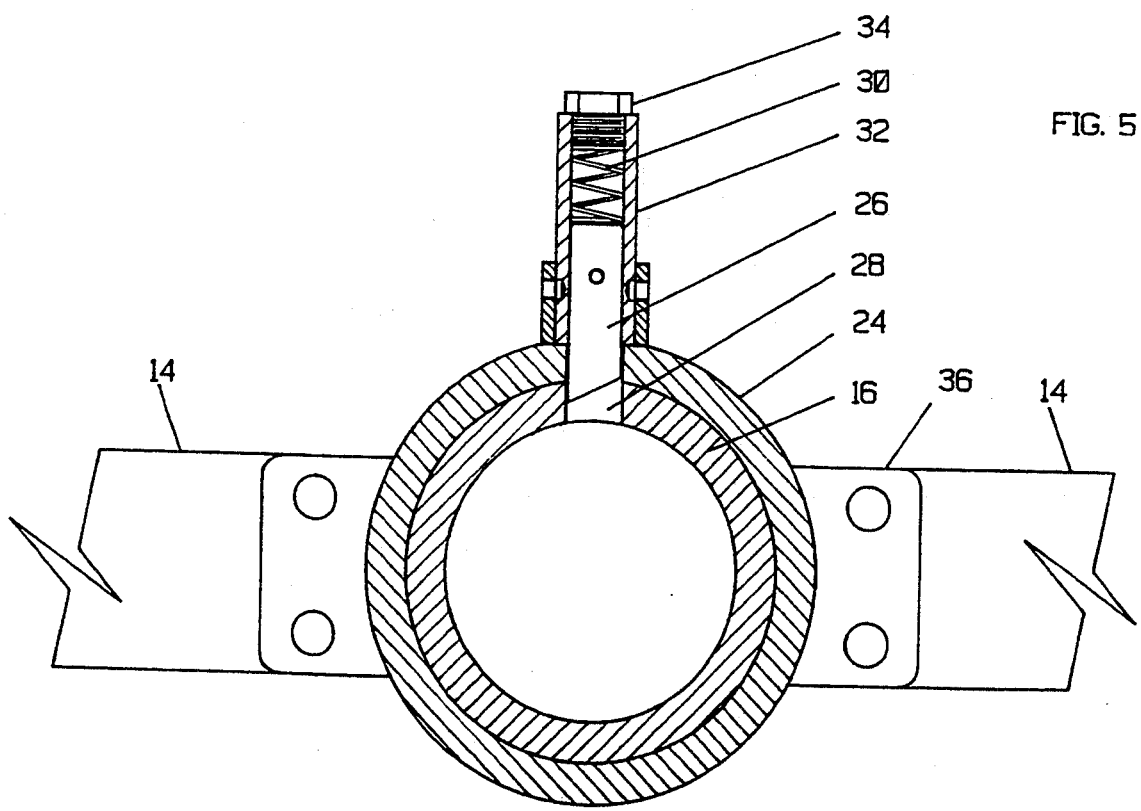
FIG. 5 is a sectional side view through the lines 5—5 of FIG. 4.

As can be seen from FIGS. 4 and 5, each sleeve 24 has two flails 14 mounted thereon. The flails are located 180° apart so that the sleeve is balanced as it rotates. Each sleeve 24 contains a spring-mounted pawl 26. The shaft 16 contains a series of slots 28. An inner end of each pawl 26 is held in a slot 28 by a spring 30. The spring 30 forces the pawl 28 inwards and, when the shaft rotates in a clockwise direction in the view shown in FIG. 5, the spring 30 will hold the pawl 26 within the slot 28. An inner edge of the pawl 28 is angled so that when the shaft is rotated in the counterclockwise direction, the inner edge of the pawl 26 will override the slot and the pawl will become disengaged from the slot. Thus, the sleeve 24 will then be rotatable relative to the shaft 16. Obviously, if the sleeve rotates 360° beyond the slot 28, the pawl 26 will again become engaged in the slot but it will immediately slip out again (upon further rotation of the shaft). The pawl 26 and spring 30 are located in a pawl guide 32 capped by a spring retainer 34. Preferably, a rest 35 extends across the reactor adjacent to the shaft 16 to limit the rotation of the flails so that they will all occupy the same horizontal plane on the return pass. Each flail 14 is mounted on a sleeve 24 by mounting brackets 36.

Figure 6:
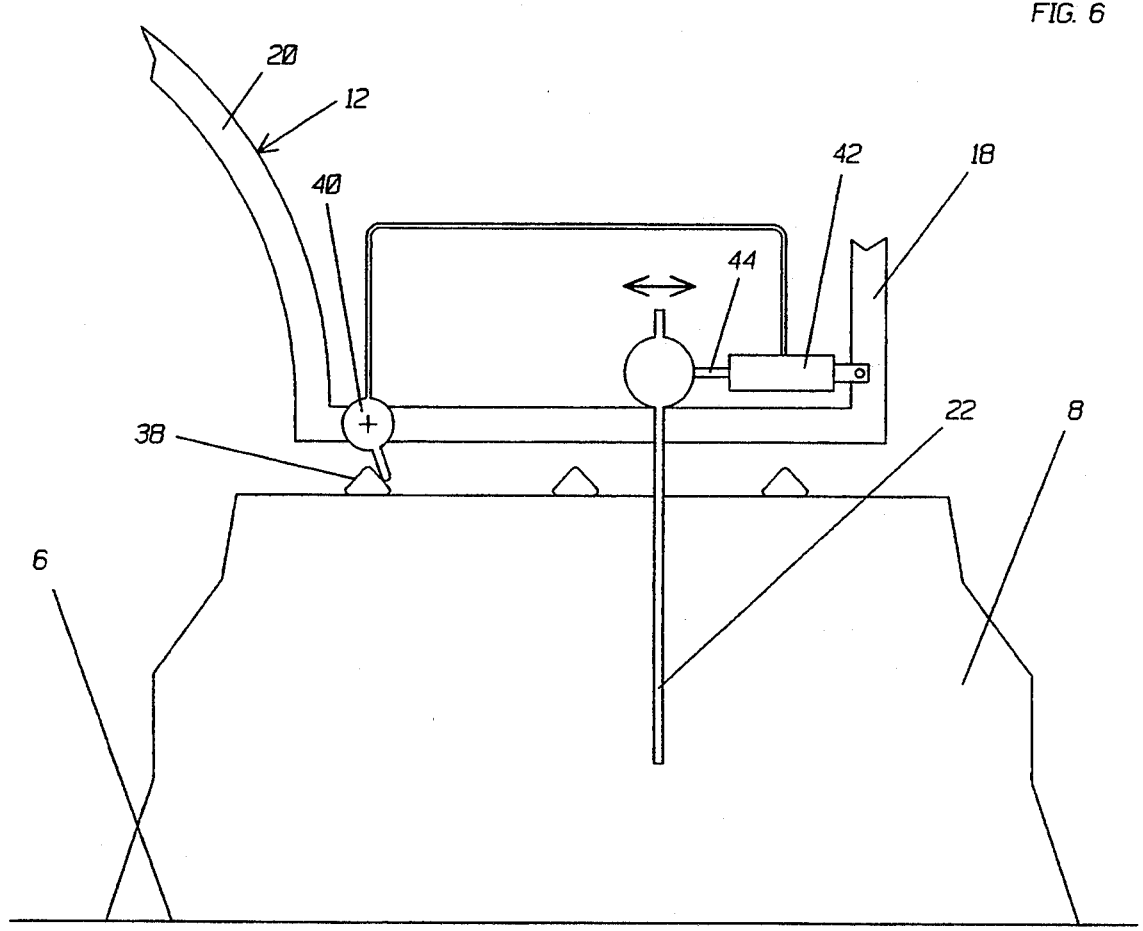
FIG. 6 is a side view of part of a reactor and a skirt.

In FIG. 6, there is shown an interior of one of the reactor walls 8 with the skirt 22 extending downward from the frame 18. Mounted on one of the side walls 8 is a plurality of trippers 38 that are spaced apart from one another. As the flailing mechanism 12 (only part of which is shown in FIG. 6) moves towards the starting end in a processing pass, the tripper trips a switch 40 which in turn sends a signal to a linear actuator 42. The actuator 42 extends an arm 44 to move the skirt 22 further from the flails (not shown in FIG. 6) as the mechanism 12 moves towards the starting end. The skirt 22 shown in FIG. 6 has a rectangular shape and is preferably made of a flexible rubber or similar material so that it can override any organic material located in the reactor but is stiff enough to block the material moved or thrown by the flails.

The details of the mounting of the flail mechanism relative to the reactor have been omitted as they are conventional. The flail mechanism can be mounted to ride on the side walls of the reactor. Alternatively, the flail mechanism can be mounted to ride on a floor outside of each side wall of the reactor. One flail mechanism could be used to move the compost in two or more reactors. Also, a reactor could be constructed with a double side wall and the flail mechanism could ride between each of the double side walls.

Some of the several advantages of the present invention will now be discussed. Firstly, the slots in the shaft can be machined at any suitable locations to create any interval or radial pattern desired with the flails. Secondly, the composting machine can be used in a building that would not have sufficient vertical height to accommodate a prior art machine that required the flailing mechanism to be vertically raised during the return pass. In addition, the skirt allows greater control of the composting operation so that material is not moved too far along the length of the reactor. The fact that the skirt is moved further from the flails as the flailing mechanism proceeds through the processing pass from the finishing end to the starting end allows the depth of the organic material to be maintained substantially constant throughout the reactor. With previous composting machines, the depth of organic material decreases from the starting end to the finishing end. Such a prior art machine will not process as much material in a given length of reactor as can be processed by the present invention. While it is suggested that the shaft have a flail rest extending across it so that, when the flails move to the second position, the rest ensures that the flails will occupy one plane. This rest is preferred but not necessary. As long as the flails are in the second position so that they can rotate relative to the shaft during the return pass, the position of the flails will automatically adjust as the flailing mechanism moves past the organic material.

What I claim as my invention is:

1. A composting machine for use with an alongated reactor in agitating organic material to said aerobic decomposition in a composting process, said reactor having a base and two parallel side walls, said reactor having a starting end and a finishing end, said composting machine comprising a flail mechanism having a plurality of flails radially mounted on a shaft, said shaft being rotatably mounted in a suitable frame and being substantially perpendicular to said side walls, said frame being mounted on said reactor and being movable longitudinally relative thereto, said flails being mounted on said shaft by mounting means so that said flails have a first position and a second position, in said first position the flails being rotatable with said shaft and being spaced circumferentially about said shaft, said flails being mounted to contact part of any material in the reactor as said flails rotate to move the material contacted along said reactor toward said finishing end, and in said second position said flails being rotatably uninhibited for a limited degree of rotation relative to said shaft, with power means to rotate said shaft and to move said frame longitudinally.

2. A composting machine as claimed in claim 1 wherein the frame for the flails moves longitudinally from said finishing end to said starting end during a processing pass with the flails rotating in a direction to move the material contacted toward said finishing end.

3. A composting machine as claimed in claim 2 wherein the mounting means for the flails are a plurality of sleeves that are slidably mounted along said shaft, each sleeve supporting at least one flail, each sleeve having a spring-mounted pawl thereon, a spring forcing said pawl inward, said shaft containing suitably located slots to receive each pawl, said slots being located so that the flails are spaced around the circumference of said shaft when said pawls extend into said slots, said pawls being removable from said slots so that said sleeves can freely rotate relative to said shaft through a limited degree of rotation.

4. A composting machine as claimed in claim 3 wherein there are two flails mounted on each sleeve, said two flails being 180° apart from one another.

5. A composting machine as claimed in claim 4 wherein the slots are located so that said flails are substantially equally spaced around a circumference of said shaft when said pawls are located in said slots.

6. A composting machine as claimed in claim 5 wherein there are means for automatically disengaging said pawls from said slots.

7. A composting machine as claimed in claim 6 wherein the means for disengaging said pawls from said slots is to rotate said shaft in an opposite direction, a base of each pawl being angled so that when the shaft rotates in one direction, each pawl remains within each slot and when the shaft rotates in an opposite direction, each pawl overrides each slot and disengages from each slot.

8. A composting machine as claimed in any one of claims 1, 3 or 7 wherein there is a movable rest that extends along the shaft to limit the degree of rotation of the flails as they rotate freely relative to the shaft so that the flails lie in a horizontal plane in the second position.

9. A composting machine as claimed in claim 7 wherein there is a skirt extending at least substantially across said reactor adjacent to said flails so that a distance that material can be thrown by said flails in a single pass will generally be limited by said material striking said skirt.

10. A composting machine as claimed in claim 9 wherein the skirt is supported by the frame so that it can swing freely about its upper edge.

11. A composting machine as claimed in claim 10 wherein a maximum distance of the skirt from a leading edge of the flails ranges from approximately 50% to approximately 70% greater than a minimum distance during a processing pass.

12. A composting machine as claimed in claim 10 wherein a location of the skirt is controlled so that the skirt is a minimum distance from a leading edge of said flails when said flails begin the processing pass and a maximum distance from the leading edge when the flails complete the processing pass.

13. A composting machine as claimed in claim 12 wherein the movement of the skirt is controlled by a linear actuator which is set up so that the skirt is a minimum distance from a leading edge of said flails when the flails begin the processing pass, said distance steadily increasing as said flails move along said reactor and said skirt being at a maximum distance from a leading edge of said flails when the flails complete the processing pass.

14. A composting machine for use with an elongated reactor in agitating organic material to aid aerobic decomposition in a composting process, said reactor having a base and two parallel side walls, said reactor having a starting end and a finishing end, said composting machine comprising a flail mechanism having a plurality of flails radially mounted on a shaft, said shaft being rotatably mounted on a suitable frame, said frame being mounted on said reactor and being movable longitudinally thereto, said flails being mounted on said shaft so that they contact part of any organic material in said reactor during a processing pass and are out of contact with any organic material in said reactor in a return pass, a skirt extending at least substantially across said reactor adjacent to said flails so that a distance that material can be moved by said flails in a single pass will generally be limited by said material striking said skirt, said skirt being supported by said frame, said skirt being supported so that it can swing freely about its upper edge, with a power means to rotate said flails, move the frame longitudinally and to adjust the distance of said skirt from said flails.

15. A composting machine as claimed in claim 14 wherein the distance of the skirt from the leading edge of said flails is adjustable during a processing pass.

16. A composting machine as claimed in claim 15 wherein a maximum distance of the skirt from a leading edge of the flails ranges from approximately 50% to approximately 70% greater than a minimum distance.

17. A composting machine as claimed in claim 14 wherein the movement of the skirt is controlled by a linear actuator which is set up so that the skirt is a minimum distance from the leading edge of said flails at the finishing end, said distance changing as the flails move along said reactor and said skirt is a maximum distance from the leading edge of said flails at the starting end.

18. A composting machine as claimed in claim 17 wherein said flails are mounted on said shaft by mounting means so that said flails have a first position and a second position, in said first position the flails being rotatable with said shaft and being spaced circumferentially about said shaft, the flails being mounted to contact part of any material in the reactor as said flails rotate to move the material contacted along said reactor towards said finishing end, and in a second position said flails lying in the same plane as that of the longitudinal axis of said shaft.

19. A composting machine as claimed in claim wherein the frame for the flails moves longitudinally from said finishing end to said starting end during a processing pass with the flails rotating in a direction to move the material towards said finishing end.

20. A composting machine as claimed in claim 17 wherein the mounting means for the flails are a plurality of sleeves that are slidably mounted along said shaft, each sleeve supporting at least one flail, each sleeve having a spring-mounted pawl, a spring forcing said pawl inward, said shaft containing suitably located slots to receive each pawl, said slots being located so that the flails are spaced around the circumference of said shaft when said pawls extend into said slots, said pawls being removable from said slots so that said sleeves can rotate freely relative to said shaft.

21. A composting machine as claimed in claim 20 wherein a rest extends across the frame to limit the degree of rotation of the flails as they rotate uninhibited relative to the shaft so that said flails are substantially horizontal.

22. A composting machine as claimed in claim 20 wherein there are two flails mounted on each sleeve, said two flails being 180° apart from one another.

23. A composting machine as claimed in claim 20 wherein the slots are located so that said flails are substantially equally spaced around a circumference of said shaft when said pawls are located in said slots.

24. A composting machine as claimed in claim 21 wherein there are means for automatically disengaging said pawls from said slots.

25. A composting machine as claimed in claim 24 wherein the means for automatically disengaging said pawls from said slots is to rotate said shaft in an opposite direction, a base of each pawl being angled so that when the shaft rotates in one direction, each pawl remains within said slot and when the shaft rotates in an opposite direction, each pawl overrides each slot and disengages from each slot.

26. A composting machine as claimed in claim 24 wherein the flails lie in a horizontal plane in the second position.

27. A method of operating a composting machine for use with an elongated reactor in agitating organic material to aid aerobic decomposition where said reactor having a base and two parallel side walls, the reactor having a starting end and a finishing end said composting machine comprising a flail mechanism having a plurality of flails radially mounted on a shaft, said shaft being rotatably mounted in a suitable frame and being substantially perpendicular to said side walls, said frames being mounted on said reactor and being movable longitudinally relative thereto, with power means to rotate said shaft and to move said frame longitudinally, with means to limit the distance that the material is moved by the flails during a processing pass, said method comprising commencing a processing pass at a finishing end with the means for limiting at a minimum distance from a leading edge of said flails, causing the means for limiting to move steadily away from said leading edge as said flails move along the reactor until said flails reach the starting end where the means for limiting is at a maximum distance from said leading edge of said flails.

28. A method as claimed in claim 27 wherein the limiting means is a skirt and the method includes the steps of adjusting a maximum distance of the skirt from the leading edge of said flails in a range of approximately 50% to approximately 70% greater than a minimum distance during a processing pass.

* * * * *